United States Patent Office 3,450,827
Patented June 17, 1969

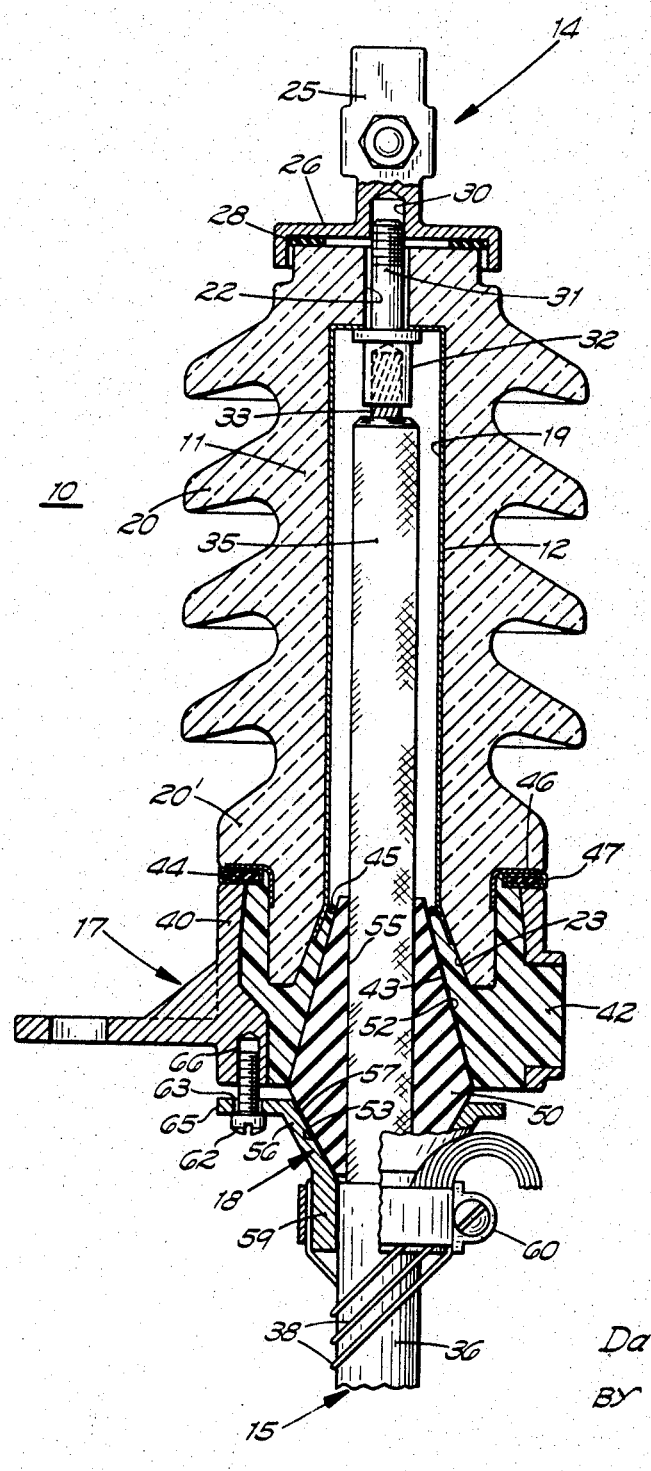

3,450,827
CABLE TERMINATION HAVING STRESS RELIEF MEANS
Davis M. Phillips, South Milwaukee, Wis., assignor to McGraw-Edison Company, Milwaukee, Wis., a corporation of Delaware
Filed May 23, 1967, Ser. No. 640,624
Int. Cl. H02g 3/06
U.S. Cl. 174—73                                   2 Claims

ABSTRACT OF THE DISCLOSURE

A cable termination comprising a hollow insulating housing for receiving a cable and having a connector adjacent one end and stress relief means adjacent its other end and conductive means disposed on the internal surface of the housing and extending between the terminal means and the stress relief means.

Background of the invention

Cables employed for the underground distribution of electrical power, generally include a central conductor surrounded by insulation and a grounded conductive outer coating or sheath. When such cables are terminated the outer coating is removed sufficiently far back from the exposed cable conductor to prevent electrical discharge and creepage along the surface of the cable insulation. This results in excessive potential gradients near the terminal end of the outer conductive sheath. As a result it has been necessary to use cable terminating structure which generally includes stress relief means at the terminal end of the outer sheath and a hollow insulating housing surrounding the bared cable insulation and filled with an insulating material. In the installation of cable termination assemblies of this type, it was necessary to insure that no low dielectric air filled voids existed in the stress relief means or the insulation filled insulating housing. Such voids become the initiating point of ionization and the consequential deterioration of the insulation.

In one type of prior art cable termination assembly the stress relief means was formed by manually wrapping tape in a double conical shape and then filling the hollow insulating housing with an insulating compound. Such assemblies were expensive, time consuming and difficult to fabricate and install and could not be disassembled. Some of these shortcomings were eliminated by another type of prior art termination assembly wherein the stress relief means and the air excluding insulation took the form of a molded insulating member which was tightly fit between the cable and the internal surface of the insulating housing. However, such molded insulating members were expensive, and an individually sized member was necessary for each cable size.

It is an object of the invention to provide a cable termination assembly which can be rapidly assembled without special skills or equipment.

Another object of the invention is to provide a cable termination assembly which does not require the insertion of insulating compound or preformed insulating material between the cable and the internal surface of the insulating housing.

Yet another object of the invention is to provide an inexpensive cable termination assembly which may be readily assembled or disassembled and which may be readily adapted to accommodate various sized cables.

Summary of the invention

In general terms, the invention comprises apparatus for terminating the end of a cable and comprising a hollow insulating housing having a connector adjacent one end and stress relief means adjacent its other end and conductive stress removing means for removing stress from the hollow interior of the housing.

Brief description of the drawing

The single figure of the drawing shows a side elevational view, partly in section, of a cable termination assembly according to the instant invention.

Description of the preferred embodiment

The cable termination 10, according to the instant invention, includes a hollow, generally tubular open-ended insulating housing 11 having a generally cylindrical central bore 12 and a connector assembly 14 at one end for connection to a cable 15 extending through said bore. The other end of housing 11 is affixed to a base assembly 17 which is constructed and arranged to receive a stress relief assembly 18. A conductive coating 19 is applied to the bore 12 and extends from the connector assembly 14 to the stress relief assembly 18.

The insulating housing 11 may be formed of any suitable insulating material, such as porcelain, and may have a plurality of skirts 20 to increase the creepage distance along its outer surface. A first aperture 22 is formed in the upper end of the insulating housing 11 for receiving the terminal assembly 14 while a second aperture 23 is formed at its lower end for receiving the cable 15 and the stress relief assembly 18.

The connector assembly 14 may include a connector member 25 constructed and arranged at its upper end for engaging a conductor (not shown) for placing electrical apparatus (not shown) in circuit with the cable 15. A flange 26 may extend laterally from the connector member 25 for cooperating with a gasket 28 for sealing the opening 22 in the upper end of the housing 11. The member 25 may also have an internally threaded, recessed opening 30 for receiving an externally threaded terminal stud 31 which may be suitably crimped at 32 to the primary conductor 33 of the cable 15.

The primary conductor 33 of the cable 15 is surrounded by insulation 35 and an outer conductive sheath 36 which is in turn surrounded by a plurality of metallic conductive neutral strands 38. The cable 15 is terminated at the assembly 10 by laying back the neutral strands 38 and thereafter removing a terminal portion of the conductive sheath 36 and the insulation 35 to expose the primary conductor 33. Thereafter, a length of the conductive sheath 36 is removed from the cable insulation 35.

The base assembly 17 may include a metallic mounting ring 40 and a base portion 42 which may be of any suitable insulating material, such as epoxy. The base portion 42 may have a generally annular configuration and may be molded to the base of the insulating housing 11 to form an extension thereof and to affix the mounting ring thereto. A generally frustoconical surface 43 may be formed in the base portion 42 and with its small diameter end in substantial registry with the bore 12 of insulating housing 11. In addition, a first gasket 44 may be disposed between the mated upper ends of the mounting ring 40 and the base portion 42 and the lowermost skirt 20' of the insulating housing 11, and second gasket 45 may be disposed between the end of the surface 43 and bore 12.

A conductive surface 46 may be formed on the housing 11 adjacent the gasket 45 and the upper end of the base portion 42. The surface 46 may be connected by a conductive shunt member 47 to the metallic grounded mounting member 40. As a result, the ground potential will be shunted around the gasket 45 and the base portion 42 so that no electrical stress will be placed across the base portion 42 at this point.

The stress relief means 18 includes a gland member 50 of substantially noncompressible resilient insulating material and which has frustoconical surfaces 52 and 53 facing in each axial direction and an axial bore 55 which fits over the cable insulation 35 from which the conductive outer sheath 36 has been removed. The bore 55 is of such a dimension, with respect to the diameter of the cable insulation 35, that a slight interference fit is effective as it is axially compressed into place about the cable end.

The stress relief means 18 also includes a hollow metallic conductive stress relief member 56 whose inner surface 57 is complementary to the frustoconical surface 53 on the gland member 50. A tubular extension 59 may be formed on the member 56 for being received over the conductive sheath 36 on cable 15. The neutral strands 38 may be secured to the stress relief member 56 by a compression type clamp 60 which also urges the tubular extension 59 against the conductive sheath 36.

The stress relief member 56 may be secured to the mounting ring 40 by a plurality of screws 62 (only one of which is seen in the drawing) and which may extend through suitable openings 63 formed in each of a plurality of ears 65 spaced around the periphery of the large diameter end of member 56 for threadably engaging suitable tapped holes 66 formed in the mounting ring 40. Tightening of the screws 62 forces the stress relief member 56 into high pressure engagement with the gland 50 which, in turn, forces the gland surface 52 against the base portion surface 43. Because gland 50 is resilient, the high pressure engagement between the surfaces 43 and 52, low dielectric strength voids or air pockets between the gland 50 and the base portion 42 are eliminated.

It will be appreciated that, because the terminal stud 31 is in contact with the conductive coating 19 disposed on the bore 12 of the housing 11, said coating will be at the same potential as the primary conductor 33 of the cable 15. In addition, because the coating 19 extends for the entire length of the bore 12 and for a short distance along the inclined surface 23 at the lower end of insulating housing 11, there will be no potential stress within the bore 12 and particularly the air space between the cable insulation 35 and the coating 19. As a result, there is no tendency for ionization to occur in this air space and accordingly no tendency for the cable insulation 35 to deteriorate. For this reason no air excluding insulation is required in the bore 12 as in prior art termination assemblies. In addition, the termination assembly 10 may be easily disassembled by removal of the terminal member 25 at the upper end of the assembly and the screws 62 at the lower end thereof. This permits repair or replacement of parts or the salvage of the entire assembly which is not possible with prior art termination assemblies using housing members which are filled with an insulating compound. In addition, the assembly 10 can accommodate a wide range of cable sizes with only an interchange of the stress relief gland 50. Prior art assemblies which employ a premolded insulating member within the housing 11 require an individually sized member for each cable size.

I claim:

1. Terminating means including a hollow insulating housing having an opening formed therein receiving the terminal end of a high voltage cable, connector means spaced from said opening and engaging the primary conductor of said cable, wherein a gap exists between the interior surface of said housing and said cable, and stress removing means for removing electrical stress from the hollow interior of said housing, the opening being formed in one end of said housing and connector means disposed at the other end thereof and stress relief means disposed at said one end of said housing, said stress removing means comprising conductive means extending between said connector means and said stress relief means, said conductive means comprising a conductive coating formed on the internal surface of said housing, said hollow insulating housing comprising a generally elongated member having a generally cylindrical bore, said conductive coating covering substantially said entire bore and being electrically connected to said connector means, said stress relief means comprising an insulating gland member surrounding said cable and having a pair of axially extending surfaces, a first of said surfaces being complementary to the opening at said one end of the insulating housing and a second surface being substantially frustoconical and a conductive stress relief member having an inner surface complementary to the frustoconical surface of said gland member, said terminating means including first means attaching the small diameter end of said stress relief member to said cable and second means affixing the large diameter end of said stress relief means to said insulating housing, said second means acting to compress said insulating gland member between said stress relief member and said opening to eliminate low dielectric strength air gaps between said opening and said first surface of said gland member, said terminating means having conductive mounting means affixed to said insulating housing and being electrically connected to said stress relief member, an insulating base means molded to said insulating housing for attaching said conductive mounting means thereto, said insulating base means having a generally frusto-conical entrant surface formed therein and the small diameter end of which is in substantial registry with said center bore, said entrant surface being complementary to said first surface of said gland member.

2. The assembly set forth in claim 1, wherein the high voltage cable has a conductor surrounded by insulation, an outer conductive wrapping terminating back from the end of said insulation and adjacent said stress relief means, and means electrically connecting said conducting surface to said stress relief member.

References Cited

UNITED STATES PATENTS

| 1,748,696 | 2/1930 | Austin | 174—19 |
| 2,411,656 | 11/1946 | Henderson et al. | 174—73 |

FOREIGN PATENTS 375,465   6/1932   Great Britain.

LARAMIE E. ASKIN, *Primary Examiner.*

U.S. Cl. X.R.

174—75, 80